United States Patent [19]

Watanabe et al.

[11] Patent Number: 5,141,036

[45] Date of Patent: * Aug. 25, 1992

[54] METHOD OF FILLING A LIQUID CRYSTAL DEVICE WITH INTRODUCTION OF LIQUID CRYSTAL BY INCREASING PRESSURE

[75] Inventors: Toshio Watanabe; Masahiko Sato; Akio Osabe, all of Kanagawa; Hiroyuki Sakayori, Tokyo; Akira Mase, Kanagawa, all of Japan

[73] Assignee: Semiconductor Energy Laboratory Co., Ltd., Kanagawa, Japan

[*] Notice: The portion of the term of this patent subsequent to May 8, 2007 has been disclaimed.

[21] Appl. No.: 727,626

[22] Filed: Jul. 10, 1991

Related U.S. Application Data

[60] Continuation-in-part of Ser. No. 506,165, Apr. 9, 1990, abandoned, which is a division of Ser. No. 222,636, Jul. 21, 1988, Pat. No. 5,024,255.

[30] Foreign Application Priority Data

Jul. 27, 1987 [JP] Japan .................. 62-188442

[51] Int. Cl.⁵ .............. G09F 9/00; G09F 1/13; G09F 1/00; B67D 5/37
[52] U.S. Cl. .............................. 141/7; 141/1; 141/9; 156/99
[58] Field of Search ............... 141/1, 4-9, 141/11, 12, 59, 65, 69, 71, 73, 80, 82; 156/49, 145, 148, 103-105

[56] References Cited

U.S. PATENT DOCUMENTS

| | | | |
|---|---|---|---|
| 3,701,368 | 10/1972 | Stern | 141/1 |
| 4,061,163 | 12/1977 | Decker et al. | 141/7 |
| 4,064,919 | 12/1977 | Stern et al. | 141/7 |
| 4,091,847 | 5/1978 | Sorkin | 141/7 |
| 4,098,301 | 7/1978 | Bloom et al. | 141/7 |
| 4,099,550 | 7/1978 | Matsuzaki et al. | 141/51 |
| 4,713,925 | 12/1987 | Kafkis | 141/7 |
| 4,753,276 | 6/1988 | Inaba et al. | 141/7 |
| 4,922,972 | 5/1990 | Watanabe et al. | 141/4 |
| 4,922,974 | 5/1990 | Watanabe et al. | 141/4 |
| 5,024,255 | 6/1991 | Wantanabe et al. | 141/11 |

FOREIGN PATENT DOCUMENTS

| | | | |
|---|---|---|---|
| 37-34129 | 2/1962 | Japan . | |
| 0007015 | 1/1977 | Japan | 141/7 |
| 0168627 | 12/1981 | Japan | 141/1 |
| 0168633 | 12/1981 | Japan | 141/1 |

Primary Examiner—Ernest G. Cusick
Attorney, Agent, or Firm—Sixbey, Friedman, Leedom & Ferguson

[57] ABSTRACT

A method for manufacturing a liquid crystal device in which a pair of substrates are placed in a vacuum chamber, with at least one inlet port provided for communicating with an inner space between the pair of substrates. The vacuum chamber is evacuated and a material including liquid crystals is supplied to the inlet port. The pressure of the chamber is then elevated such that the liquid crystal and other materials are introduced into the space between the pair of substrates by the use of differential pressure between the inside and outside of the space between the substrates. The material including the liquid crystals is maintained at a sufficiently high temperature such that the liquid crystals exhibit isotropic phases.

8 Claims, 4 Drawing Sheets

F I G. 4
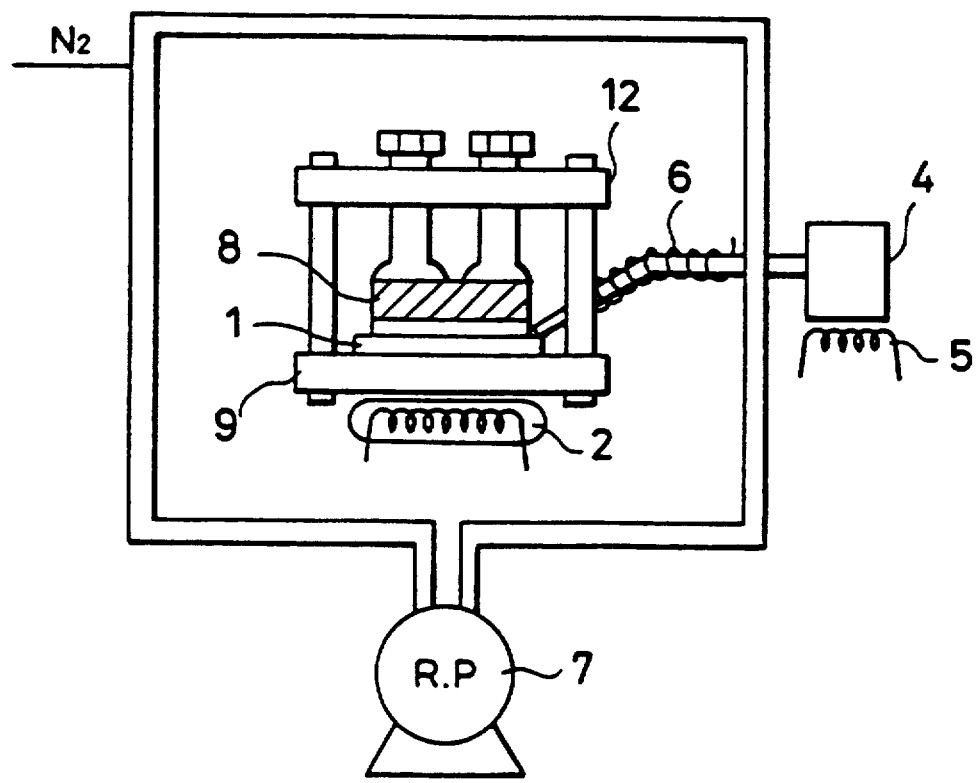

METHOD OF FILLING A LIQUID CRYSTAL DEVICE WITH INTRODUCTION OF LIQUID CRYSTAL BY INCREASING PRESSURE

RELATED APPLICATION

This application is a continuation in part of copending application Ser. No. 07/506,165 filed Apr. 9, 1990 now abandoned which is a divisional of allowed application Ser. No. 07/222,636 filed Jul. 21, 1988 now U.S. Pat. No. 5,024,255.

BACKGROUND OF THE INVENTION

The invention relates to a method of filling a liquid crystal device for example with a ferroelectric liquid crystal material or with other liquid crystal materials.

Vacuum filling is a known method for filling the space between a pair of substrates of a liquid crystal device with a liquid crystal to manufacture a liquid crystal device. In this prior art method, the liquid crystal device is placed in a vacuum chamber at a vacuum together with the liquid crystal material, and then, after the inlet port of the device is caused to sink in the liquid crystal, the pressure is elevated so that the liquid crystal enters the liquid crystal device through the inlet port. One type of this method is described in Japanese application Ser. No. sho 60-175192.

However, there are several shortcomings associated with this method. The inlet port of the liquid crystal device is substantially narrow so that the pressure in the liquid crystal device cannot be lowered rapidly. Because of this, the liquid crystal device is subjected to the differential pressure between the inside and the outside of the liquid crystal device when the vacuum chamber is evacuated, and therefore tend to be deformed due to the undesirable pressure.

To comply with the shortcoming, it is proposed to mate a pair of substrates firmly to bear the differential pressure and maintain the distance between substrates by making use of two or more types of spacers arranged therein. Nevertheless, in some instances the device may be destroyed due to a transient force of about 1 kg/cm$^2$ which arises during evacuation.

Furthermore, the filling process is generally carried out in a particular phase of liquid crystal. A ferroelectric liquid crystal exhibits its phase transition as the temperature varies, e.g. Cry phase $\longleftrightarrow$ SmC phase $\longleftrightarrow$ SmA phase $\longleftrightarrow$ Iso phase. This phase transition is also observed with a blended liquid crystal. An Iso (isotropic) phase is most suitable for the filling process since it exhibits a low viscosity. An example of this method is described in Japanese patent application Ser. No. sho 60-175192.

However, when a blended liquid crystal material composed of several constituent liquid crystals is used, one liquid crystal constituent has a tendency to enter through in advance of another so that, when the space is filled, the liquid crystal material becomes nonuniform and has diverse compositions different from the prescribed composition depending on the position. Having carefully investigated this phenomena, the inventors found that the transition temperature of the blended liquid crystal is not observed at a certain definitive level and a mixed phase seems to appear due to differential transition temperatures of the constituent liquid crystals. In other words, during the filling process one constituent liquid crystal can be of Iso phase while another constituent liquid crystal remains in SmC phase. This nonuniformity makes it impossible to drive the liquid crystal material by common driving conditions throughout the device.

The filling of blended liquid crystal materials into the liquid crystal material has been carried out through a plurality of openings provided around the mated substrates of the device as shown in FIG. 1(A) for accelerating the filling. Because of differential viscosities of constituents, the liquid crystal material present at the dashed area 8 (FIG. 1(B)), where the flows of liquid crystal material entering through the openings meet, has a different property than the liquid crystal material present at other areas. Orientation dispersion has been observed along the area 8. This nonuniform property of liquid crystal causes a disparity in driving performance. In some cases, it may happen that the liquid crystal becomes incapable of displaying at certain areas because of the differential transition temperatures between that position and the other positions.

SUMMARY OF THE INVENTION

It is, therefore, an object of the invention to provide a method of filling a liquid crystal device with ferroelectric liquid crystal as well as other liquid crystal materials.

It is another object of the invention to provide a method of filling a liquid crystal device with ferroelectric liquid crystal in which the yield of product is not lowered due to the process.

It is a further object of the invention to provide a method of filling a liquid crystal device which is also applicable to polymer dispersed liquid crystal devices.

BRIEF DESCRIPTION OF THE DRAWINGS

FIG. 4 is a schematic view showing another method of filling a liquid crystal device with a liquid crystal in accordance with the present invention.

DETAILED DESCRIPTION OF THE PREFERRED EMBODIMENTS

Figure 1A:
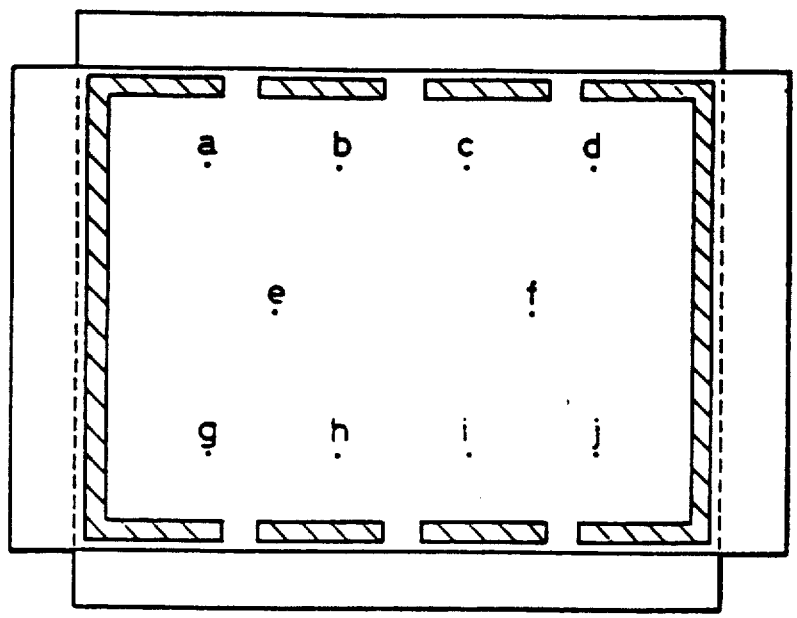
FIGS. 1(A) and 1(B) are explanatory views showing how a prior art liquid crystal device is filled with liquid crystal material.
Figure 1B:
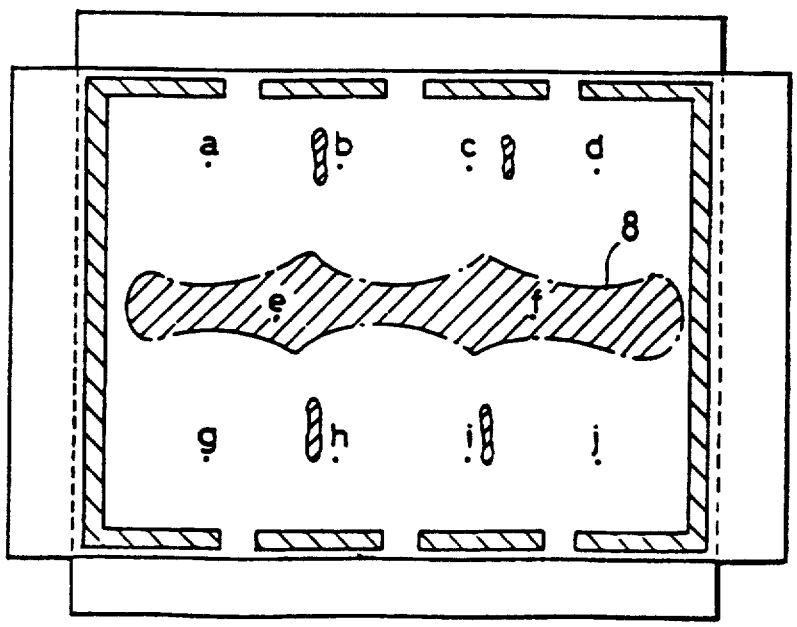
Figure 2:
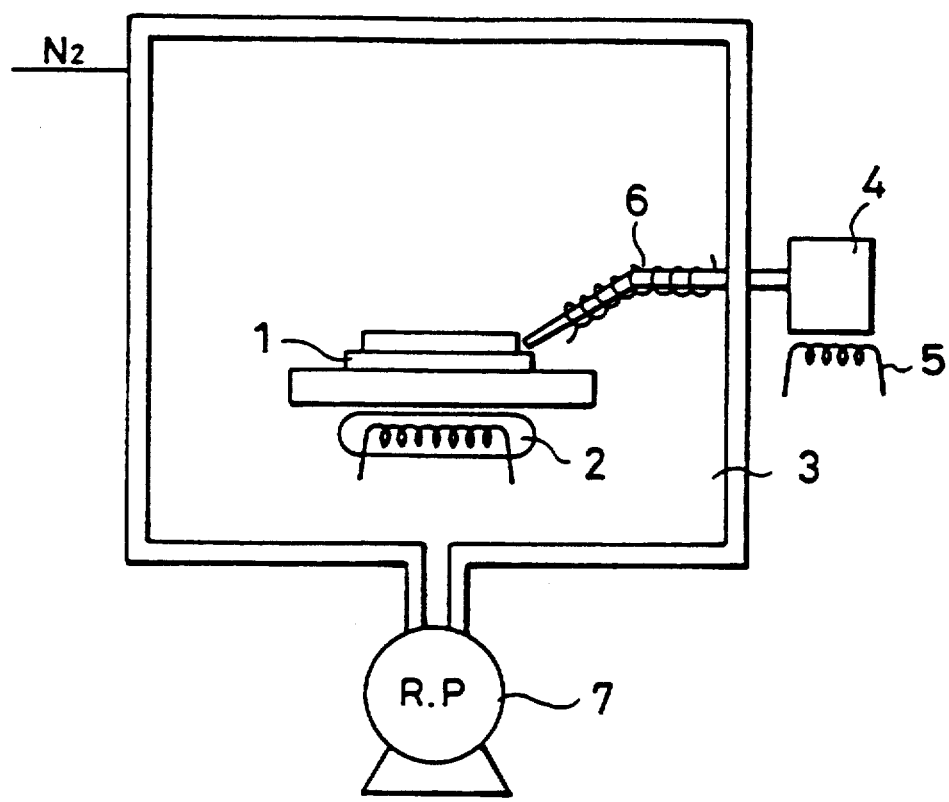
FIG. 2 is a schematic view showing a method of filling a liquid crystal device with a liquid crystal in accordance with the present invention.

Referring to FIG. 2, a method of filling a liquid crystal device with a ferroelectric liquid crystal in accordance with the present invention is described. The liquid crystal device comprises a pair of glass substrates which are firmly mated in parallel and spaced a certain distance to produce a space therebetween. The liquid crystal is such that it is in a smectic phase at room temperature.

In FIG. 2, a liquid crystal device 1 is placed in a vacuum chamber 3 followed by evacuation by a vacuum pump 7 in order to maintain the pressure in the chamber at $1 \times 10^{-4}$ Torr or higher whereas the liquid crystal device 1 is heated by a heater 2. On the other hand, a liquid crystal accumulated in a dispenser 4 is heated by a heater 5 above the transition temperature so that the liquid crystal is maintained in the Iso phase. The liquid crystal is a blended liquid crystal composed of two or more constituent liquid crystals. An amount of the liquid crystal is poured to the inlet port of the liquid crystal device. In this process, the temperature of the liquid crystal is always maintained higher than the transition temperature of any constituent liquid crystal by the heaters 2, 4 and 6.

Then, nitrogen gas is introduced at 20 SCCM to the inside of the vacuum chamber 3 to produce a differential pressure between the vacuum chamber and the inside space of the liquid crystal device to be filled with the liquid crystal material whereupon the liquid crystal in Iso phase is caused to fill the space in the device by virtue of the differential pressure. The pressure in the chamber is eventually elevated to an atmospheric pressure.

Figure 3:
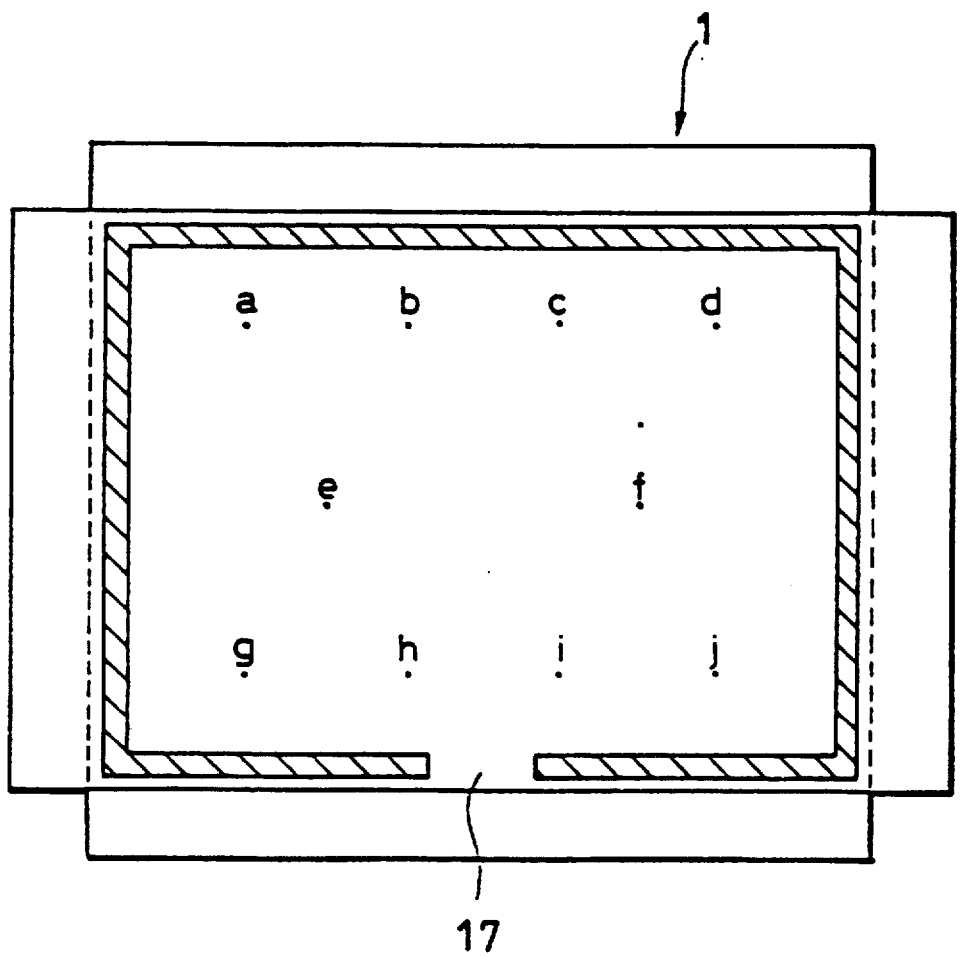
FIG. 3 is an explanatory view showing a liquid crystal device in accordance with the present invention.

The liquid crystal device 1 to be filled with the liquid crystal is prepared as illustrated in FIG. 3. The liquid crystal device is provided with a single relatively large aperture 17 as an inlet port through which the liquid crystal material is introduced into the device.

For reference, the compositions of liquid crystal materials sampled at various positions of the device prepared in accordance with the present invention and at the corresponding positions of the prior art device were examined. Four positions were selected near the aperture 17 at the same distance. In the opposite side, corresponding four positions were selected also at same distances. Two other positions were selected in the center position. The examination was implemented by liquid chromatography. The peak levels in regard to a certain constituent have been measured as below. The units of the height of peaks is centimeters.

| Position | This Invention | Prior Art |
|---|---|---|
| a | 7.0 | 7.3 |
| b | 8.0 | 7.1 |
| c | 7.3 | 9.6 |
| d | 7.5 | 5.8 |
| e | 7.4 | 10.0 |
| f | 7.2 | 5.5 |
| g | 7.6 | 6.9 |
| h | 7.2 | 7.9 |
| i | 7.5 | 8.4 |
| j | 7.1 | 7.7 |

As shown in the above data, it is noted that the constituent has been distributed uniformly throughout the device in accordance with the invention. By contrast, in accordance with the prior art, the height has been dispersed and therefore the proportion of the constituent in the liquid crystal material was varied depending on the position.

FIG. 4 is a schematic view showing a second embodiment of a method in accordance with the present invention.

In FIG. 4, like numbers are given to corresponding parts to the first embodiment and the redundant explanation is dispensed with. The liquid crystal device 1 comprising a pair of substrates with spacers in between is disposed between parallel plates 8 and 9 of a press 12. The plates have been positioned precisely in parallel with each other in advance. During the filling of the liquid crystal, the liquid crystal device is pressed in the vertical direction by means of the parallel plates 8 and 9 at 1 Kg/cm². The pressure should be determined in accordance with the vacuum level, e.g. 0.5-5.0 Kg/cm².

The present invention should not be limited to the specific types of the liquid crystal devices disclosed in the above embodiments, however, since the advantages are also applicable to other types of liquid crystal devices. Examples of the other types of the liquid crystal devices are TN type liquid crystal devices, STN type liquid crystal devices, polymer dispersed liquid crystal devices and micro-capsuled liquid crystal devices.

In the case that a polymer dispersed liquid crystal device is manufactured utilizing the method of the present invention, a blended liquid crystal mixed with a UV hardening resin is first prepared. An example of the blended liquid crystal is cyanobiphenyl base liquid crystals which exhibit a nematic phase at room temperature. The transition temperature of the cyanobiphenyl base liquid crystals at which the phase transition occurs between a nematic phase and an isotropic phase is generally in the range of 60° C. to 120° C., which depends upon the materials. Examples of the UV hardening resin are acrylic monomer, acrylic oligomer and polyurethane based resin. Some kinds of silicone resins can also be used for this purpose.

In accordance with the present invention, the mixture of the blended liquid crystal and the UV hardening resin is heated above the transition temperature at which the blended liquid crystal changes its phase from the nematic phase to the isotropic phase. The heated liquid crystal is introduced into the space between the pair of substrates by the use of a differential pressure between the inside and the outside of the liquid crystal device as explained before. Finally, the resin introduced between the pair of substrates is hardened by an irradiation of a UV light. Preferably, the irradiation is performed at a temperature above the transition temperature of the liquid crystal such that the liquid crystal can be more uniformly dispersed in the resin. Instead of the UV hardening resins, a thermosetting resin can also be utilized.

Also, in the case of the micro-capsuled liquid crystal devices, a blended liquid crystal including cholesteric or chiral nematic liquid crystals are encapsulated by a polymer, for example, a hydrophilic polymer. The capsules in which the blended liquid crystal is enclosed are dispersed in an appropriate liquid such as polyacrylamide or water and introduced into a pair of substrates in the same manner as in the foregoing embodiments.

While a description has been made for several embodiments, the present invention should be limited only by the appended claims and should not be limited by the particular examples. For example, although the opening provided on the sealing member is only one, two openings can be formed, one being for the entrance of liquid crystal and other for evacuating the inside air during filling step.

We claim:

1. A method of introducing a liquid crystal into a space between a pair of substrates having an inlet port comprising the steps of:
   placing said pair of substrates in a vacuum chamber;
   evacuating said vacuum chamber;
   supplying through said inlet port a material including a blended liquid crystal; and
   elevating the pressure in said chamber so that said blended liquid crystal is introduced into the space between the pair of substrates by the use of the differential pressure between the inside and the outside of the space,
   wherein the temperature of said material including the blended liquid crystal is maintained high enough such that said blended liquid crystal exhibits an isotropic phase.

2. The method of claim 1 wherein said blended liquid crystal is a mixture of plural kinds of liquid crystal materials.

3. A method of introducing a polymer dispersed liquid crystal into a space between a pair of substrates having an inlet port comprising the steps of:

placing said pair of substrates in a vacuum chamber;

evacuating said vacuum chamber;

supplying said inlet port with a UV hardening resin in which nematic liquid crystals is dispersed;

elevating the pressure in said chamber so that said resin with said liquid crystals is introduced into a space between the pair of substrates by the use of a differential pressure between the inside and the outside of the space, wherein the temperature of said UV hardening resin with the liquid crystals is maintained high enough while the liquid crystals are introduced into the space between the pair of substrates such that the liquid crystals exhibit isotropic phases.

4. The method of claim 3 wherein said UV hardening resin comprises a material selected from the group consisting of an acrylic monomer, an acrylic oligomer and a polyurethane resin.

5. The method of claim 3 wherein said liquid crystals are cyanobiphenyl based materials.

6. The method of claim 5 wherein the temperature of the liquid crystals are maintained at a temperature in the range of 60 to 120° C. while the liquid crystals are introduced into the space between the pair of substrates.

7. The method of claim 3 further comprising the step of irradiating said resin with a UV light after introduction into the space in order that said resin is hardened.

8. The method of claim 7 wherein said resin is maintained at a temperature during the step of irradiating said resin, at which the liquid crystals exhibit isotropic phases.

* * * * *